United States Patent Office 2,848,343
Patented Aug. 19, 1958

2,848,343
PROCESS FOR PRODUCING CELLULOSE TRIESTERS

Edward J. Costello, Philadelphia, Pa., assignor to American Viscose Corporation, Philadelphia, Pa., a corporation of Delaware No Drawing. Application May 4, 1955
Serial No. 506,083

12 Claims. (Cl. 106—196)

This invention relates to the preparation of cellulose esters and, more particularly, to the preparation of organic acid triesters of cellulose.

The use of sulfuric acid as an esterification catalyst has been known for quite some time. The use of ammonium sulfate as a catalyst or ammonium sulfate in conjunction with certain other salts is also known. These catalysts, however, are subject to certain limitations. Present procedures for producing the cellulose triesters of organic acids utilizing sulfuric acid as a catalyst necessitate the addition of basic compounds and water to the acetylation dopes in order to split off the sulfur containing groups and reduce the sulfur content of the ester to below the 0.1% level necessary for good stability. Addition of these basic compounds is imperative in the use of sulfuric acid catalysts. Ammonium sulfate when used as a catalyst will not promote the high degree of substitution desired. The use of ammonium sulfate in conjunction with other substances such as ammonium acetate or urea has necessitated the use of such large excess quantities of the esterification acid anhydride as to render the procedure commercially uneconomical.

It has been found that the addition of water to destroy the excess anhydride required in esterification operations results in the cleavage of over 95% of the sulfur which becomes combined with the cellulose during the esterification. However, the addition of further amounts of the acid anhydride after removal of the combined sulfur to complete the esterification of the cellulose results in the re-entry of sulfuric acid to the cellulose in almost quantitative amounts. This occurrence in spite of the competition of anhydride for the same hydroxyl groups necessitated the basic removal of sulfuric acid.

The primary object of the present invention is to provide a method for producing triesters of cellulose having a low sulfur content, high stability and a degree of substitution of not less than about 2.9 organic acid groups per glucose unit.

Another object of this invention is to provide a method for producing cellulose triesters without necessitating special handling for the removal of sulfur.

Another object is to produce a cellulose triester acid dope suitable for storage and suitable for a direct or wet spinning process.

Other objects and advantages of this invention will become apparent from the description and claims which follow.

The present invention is based upon the discovery that esterification to form relatively sulfur-free esters of cellulose having a high degree of substitution may be effected in the presence of both sulfuric acid and ammonium sulfate without the customary and required step of removing sulfuric acid before completion of esterification.

Although the method of this invention will be described and discussed in detail as it applies to the preparation of cellulose triacetate, it is to be understood that the method is equally satisfactory for the production of other esters of cellulose with lower monocarboxylic acids.

Any desired cellulose, such as cotton linters or refined wood pulp or mixtures of such cellulosic materials, may be utilized for the production of esters. The cellulosic material in fibrous form may be subjected to any desired normal pre-treatment. For example, pulp sheet may be soaked in an aqueous solution of ammonium sulfate, pressed to remove excess water and then dried and stored. The cellulosic material may be treated with a solution of the organic acid, such as, for example, acetic acid before mixing with the other ingredients.

The cellulosic material, ammonium sulfate and a quantity of the organic acid along with the anhydride of the organic acid and sulfuric acid may be introduced into an acetylator and the mass mixed at temperatures below the effective reaction temperature, for example, at room temperature. The acetylator is provided with heating means such as a jacket through which may be passed a fluid to permit a control of the temperature of the mass. During the mixing step, a cooling liquid may be circulated through the jacket if it is desired to maintain the temperature of the mass below room temperature. A jacketed Werner-Pfleiderer type acetylator or mixer is satisfactory for use in the practice of this method. This mixing step is primarily adapted to provide a thorough and intimate distribution of all of the constituents throughout the mass without effecting any appreciable reaction.

After a thorough mixture of the ingredients is obtained, a heating fluid, such as hot water, may be passed through the jacket to raise the temperature of the mass. For example, in the preparation of the acetic acid ester of cellulose, the temperature of the mass is raised to at least 60° C. It has been found that a temperature of not in excess of about 90° C. is sufficient for the reaction to proceed to substantial completion where both ammonium sulfate and sulfuric acid are present in the reaction mass. The reaction mass is maintained at a temperature exceeding 60° C. for a sufficient period of time to effect substantially complete esterification, i. e., until the reaction mixture is free of fibers. It is believed that at this point, namely, when no fibers are visible in the syrupy liquid that all of the reactable hydroxyl groups of the cellulose have been replaced by an acid radical. At this stage, some of the hydroxyl groups are replaced with acid sulfate groups and the sulfur content of the ester is far in excess of 0.1%.

Water is then added to the mass. The purpose of the addition of water is to hydrolyze the ester to remove the acid sulfate radical from the ester. Since the organic acid anhydride is used in excess of the theoretical amount necessary for the reaction, sufficient water must first be added to react with the remaining organic acid anhydride. An excess amount of water must be provided to allow the hydrolysis to be effected. For example, in the preparation of cellulose triacetate, a sufficient amount of water must be added to exceed the glacial point, i. e., the amount of water must exceed the amount of water necessary to convert the remaining acetic anhydride to acetic acid and provide sufficient water to effect the hydrolysis and removal of the acid sulfate radicals from the cellulose ester. To insure a thorough mixing and distribution of the water throughout the syrupy liquid, mixing may be continued at the elevated reaction temperature for a period of about 15 minutes.

Additional quantities of th organic acid anhydride are then added to the reaction mass and mixing of the mass is continued at the elevated temperature to allow a substantially complete esterification of the cellulose. Theoretically, during this step, the acid anhydride reacts with the hydroxyl groups which had been replaced with the acid sulfate groups or which had been blocked by the surfur containing groups.

The acid dope obtained at this point may be stored at room temperature for a period of several days. This period of storage will not effect the stability of the cellulose triester acid dope in that the same degree of substitution of acid groups per glucose unit may remain and there will be no increase of contaminating sulfur groups in said cellulose triester.

Wet or direct spinning methods may be used to produce a product such as film or filaments from the cellulose triester dope. The production of these products involves equipment similar to that used in viscose spinning and film forming with the principal difference being a warm water coagulating bath.

Where the product is to be used in conjunction with dry spinning methods, the acid dope obtained in final esterification may be introduced into hot water whereby the cellulose triester is precipitated. The ester is then separated and may be readily washed free of acid. For example, in the preparation of cellulose triacetate, upon pouring the syrupy reaction mass into hot water, the cellulose triacetate is precipitated as a snow white fibrous mass which is easily washed free of acid. The products thus formed are remarkably low in sulfur content and generally show between about 0.03% and about 0.06% sulfur. The products because of this exceedingly low sulfur content are very stable. The products have a degree of substitution generally exceeding 2.9 organic acid radical units per glucose unit.

The method of this invention may be illustrated by the following examples which are directed to the preparation of cellulose triacetate. It is to be understood that similar esters of cellulose may be prepared by the same procedure by substituting other organic acids, such as propionic acid, butyric acid and the like for the acetic acid and by substituting the corresponding acid anhydrides for the acetic anhydride. It is also to be understood that mixed cellulose esters may be prepared by utilizing mixtures of the organic acids and mixtures of the organic acid anhydrides.

The following examples are illustrative of the process to be employed:

Example 1

One hundred fifty-five kilograms of cellulose (100 kilograms dry cellulose) which had been pretreated with hot acetic acid was mixed in a jacketed acetylator with five kilograms of ammonium sulfate and 450 kilograms of glacial acetic acid. Three hundred fifty kilograms of acetic anhydride and four kilograms of sulfuric acid (specific gravity 1.8) was then added and the mass mixed for about 60 minutes at a temperature between 28° C. and 36° C. Hot water was then passed through the jacket to raise the mass to a temperature of about 80° C., meanwhile continuing the mixing operation. The time required after the mass reached 60° C. to complete the initial reaction at 80° C. and to form a clear liquid or dope free of fibers was about 90 minutes. Water was then added and the mass mixed for about 15 minutes. The amount of water exceeded that required to react with the excess acetic anhydride and reach the glacial point of acetic acid so as to provide excess water which could hydrolyze sulfur-containing groups combined with cellulose. An additional 50 kilograms of acetic anhydride were added to substantially complete the esterification. The resulting cellulose triacetate was precipitated into hot water at 90° C. The product had a substitution value of about 2.9 and contained about 0.05% sulfur.

Example 2

A mixture of 155 kilograms of hot acetic acid treated cellulose (100 kilograms dry cellulose), five kilograms of ammonium sulfate and 450 kilograms of glacial acetic acid was treated with 300 kilograms of acetic anhydride and one kilogram of sulfuric acid (specific gravity 1.8) and mixed in a jacketed acetylator. The mixture was allowed to react for 16 minutes in the acetylator at a temperature range between 28° C. and 36° C. while the mixing operation was continued. This step was followed by passing hot water through the jacket to raise the temperature of the mass to about 80° C. The time required after the mass reached 60° C. to complete the initial reaction at 80° C. and to form a clear liquid or dope free of fibers was about 90 minutes. Sufficient water was added to react with the excess acetic anhydride and reach the glacial point of acetic acid plus enough water to hydrolyze sulfur-containing cellulosic groups. Fifteen minutes was required to complete the hydrolysis reaction. An additional fifty kilograms of acetic anhydride was added for further esterification. The resulting cellulose triacetate was precipitated into hot water at 90° C. The product had a substitution value 2.9 and contained about 0.04% sulfur.

Example 3

A mass containing 155 kilograms of hot acetic acid treated cellulose (100 kilograms dry cellulose), 0.5 kilogram of ammonium sulfate and 450 kilograms of glacial acetic acid was mixed in a jacketed acetylator and then reacted in the acetylator with 300 kilograms of acetic anhydride and one kilogram of sulfuric acid (specific gravity 1.8) while continuing the mixing. The initial reaction temperature range was about 28° C. to 36° C. The temperature was held at this range for approximately 60 minutes to allow for the completion of the initial reaction. The temperature was then raised to 80° C. by passing hot water through the jacket. Ninety minutes was required to complete the reaction after a temperature of 60° C. was reached. At the end of this period a clear liquid, fiber-free dope had been formed. Sufficient water was then added to react with excess acetic anhydride and to supply enough excess water to hydrolyze surfur-containing cellulosic groups. The hydrolysis step required 15 minutes with continued mixing. An additional 50 kilograms of acetic anhydride was added for further esterification and the resulting cellulose triacetate was precipitated into hot water at 90° C. The product had a substitution value of 2.9 and contained about 0.05% sulfur.

Example 4

One hundred fifty-five kilograms of cellulose (100 kilograms dry cellulose) which had been pretreated with hot acetic acid was mixed in a jacketed acetylator with 0.5 kilogram of ammonium sulfate and 450 kilograms of glacial acetic acid. Three hundred kilograms of acetic anhydride and four kilograms of sulfuric acid (specific gravity 1.8) was then added and the mass mixed for about 60 minutes at a temperature between 28° C. and 36° C. Hot water was then passed through the jacket to raise the mass to a temperature of about 80° C. meanwhile continuing the mixing operation. The time required after the mass reached 60° C. to complete the initial reaction at 80° C. and to form a clear liquid or dope free of fibers was about 90 minutes. Water was then added and the mass mixed for about 15 minutes. The amount of water exceeded that required to react with the excess acetic anhydride and reach the glacial point of acetic acid so as to provide excess water which could hydrolyze sulfur-containing cellulosic groups. An additional 50 kilograms of acetic anhydride was added to substantially complete the esterification. The resulting cellulose triacetate was precipitated into hot water at 90° C. The product had a substitution value of 2.9 and contained about 0.05% sulfur.

Example 5

A mixture of 155 kilograms of a hot acetic acid treated cellulose (100 kilograms dry cellulose), three kilograms of ammonium sulfate and 450 kilograms of glacial acetic acid was treated with 300 kilograms of acetic anhydride and two kilograms of sulfuric acid (specific gravity 1.8) and mixed in a jacketed acetylator. The mixture was allowed to react for about 60 minutes in the acetylator at a temperature range between 28° C. and 36° C. while the mixing operation was continued. This step was followed by passing hot water through the jacket to raise the mass temperature to 80° C. The time required after the mass reached 60° C. to complete the initial reaction at 80° C. and to form a clear liquid or dope free of fibers was about 90 minutes. Sufficient water was added to react with the excess acetic anhydride and reach the glacial point of acetic acid plus an excess amount of water to hydrolyze sulfur-containing cellulosic groups. The hydrolysis reaction required 15 minutes for completion. An additional 50 kilograms of acetic anhydride was added for further esterification. A part of the liquid mass was treated to precipitate the cellulose triacetate by pouring into hot water at 90° C. The product had a substitution value of 2.9 and contained about 0.03% sulfur. The balance of the liquid mass was stored at room temperature for a period of four days before precipitating the cellulose triacetate. The cellulose triacetate removed from the stored liquid exhibited no change in substitution value or in sulfur content.

*Example 6*

One hundred five kilograms of cellulose of 5% moisture content is steeped in a 2% aqueous solution of ammonium sulfate for thirty minutes and then pressed to twice the original weight of the cellulose charge. The steeped cellulose is then dried and mixed in a jacketed acetylator with three kilograms of ammonium sulfate and 450 kilograms of glacial acetic acid. Three hundred kilograms of acetic anhydride and two kilograms of sulfuric acid (specific gravity 1.8) was then added and the mass mixed for 60 minutes at a temperature between 28° C. and 36° C. Hot water was then passed through the jacket to raise the mass to a temperature of about 80° C. meanwhile continuing the mixing operation. The time required after the mass reached 60° C. to complete the initial reaction at 80° C. and to form a clear liquid or dope free of fibers was about 90 minutes. Water was then added and the mass mixed for about 15 minutes. The amount of water exceeded that required to react with the excess acetic anhydride and reach the glacial point of acetic acid so as to provide excess water which could hydrolyze sulfur-containing cellulosic groups. An additional 50 kilograms of acetic anhydride was added to substantially complete the esterification. Resulting cellulose triacetate was precipitated into hot water at 90° C. The product had a substitution value of 2.9 and contained about 0.05% sulfur.

*Example 7*

A mixture of 105 kilograms of untreated cellulose of 5% moisture content, five kilograms of ammonium sulfate and 450 kilograms of glacial acetic acid was treated with 300 kilograms of acetic anhydride and one kilogram of sulfuric acid (specific gravity 1.8) and mixed in a jacketed acetylator. The mixture was allowed to react for 16 minutes in the acetylator at a temperature range between 28° C. and 36° C. while the mixing operation was continued. This step was followed by passing hot water through the jacket to raise the temperature of the mass to about 80° C. The time required after the mass reached 60° C. to complete the initial reaction at 80° C. and to form a clear liquid or dope free of fibers was about 90 minutes. Sufficient water was added to react with the excess acetic anhydride and reach the glacial point of acetic acid plus enough water to hydrolyze sulfur-containing cellulosic groups. Fifteen minutes was required to complete the hydrolysis reaction. An additional 50 kilograms of acetic anhydride was added for further esterification. The resulting cellulose triacetate was precipitated into hot water at 90° C. The product had a substitution value 2.9 and contained about 0.04% sulfur.

As can be seen from foregoing examples, no special treatment is necessary for the removal of sulfur-containing compounds from the cellulose molecule before final acetylation where both ammonium sulfate and sulfuric acid are present as catalysts.

I claim:

1. In a process for preparing stable cellulose triesters having a combined sulfur content of less than about 0.1%, the step which comprises esterifying the cellulose in the presence of from about 0.005 to about 0.05 part of ammonium sulfate and from about 0.001 to about 0.04 part of sulfuric acid per part of cellulose.

2. The step as defined in claim 1 wherein the esterification comprises acetylation.

3. In a process for preparing stable cellulose triesters having a combined sulfur content of less than about 0.1%, the steps which comprise esterifying the cellulose with a lower aliphatic monocarboxylic acid anhydride in the presence of ammonium sulfate and sulfuric acid, treating the reaction mass with water to convert free acid anhydride to its acid and to partially hydrolyze the ester to remove the sulfur-containing radicals from the cellulose and subsequently reacting the diluted reaction mass with additional acid anhydride to substantially completely esterify the cellulose.

4. The steps as defined in claim 3 wherein the acid anhydride is acetic anhydride.

5. The method for increasing the affinity of cellulose for an acetyl group in the presence of sulfuric acid and an organic acid anhydride which comprises adding to and incorporating in a mixture comprising cellulose, sulfuric acid and an organic acid anhydride from about 0.005 to 0.05 part of ammonium sulfate per part of cellulose.

6. The process for preparing stable cellulose triesters having at least about 2.9 organic acid groups per glucose unit and containing not more than about 0.1% combined sulfur which comprises mixing cellulose, a lower aliphatic monocarboxylic acid, an anhydride of the acid, ammonium sulfate and sulfuric acid at a temperature below about 60° C., raising the temperature of the mass to not more than about 90° C., maintaining the temperature of the mass between about 60° C. and about 90° C. for a sufficient period to form a fiber-free liquid mass containing partially esterified cellulose wherein some of the hydroxyl groups have been replaced by acid sulfate groups, adding water to the liquid mass to convert the free acid anhydride to acid and to remove substantially all of the sulfur containing groups from the cellulose ester and thereafter adding additional acid anhydride to substantially complete the esterification.

7. The process for preparing stable cellulose triacetate having at least about 2.9 acetyl groups per glucose unit and containing not more than about 0.1% combined sulfur which comprises mixing cellulose, acetic acid, acetic anhydride, ammonium sulfate and sulfuric acid, at a temperature below about 60° C., raising the temperature of the mass to not more than about 90° C., maintaining the temperature of the mass between about 60° C. and about 90° C. for a sufficient period to form a fiber-free liquid mass containing partially acetylated cellulose wherein some of the hydroxyl groups have been replaced by acid sulfate groups, adding water to the liquid mass to convert the acid anhydride to acid and to remove the sulfur containing radicals from the cellulose acetate and thereafter adding additional acetic anhydride to substantially complete the esterification.

8. As an article of manufacture, an acidic spinning dope comprising a cellulose triester having a combined sulfur content of not more than about 0.1%, an acid solvent for the cellulose triester, sulfuric acid and ammonium sulfate, the spinning dope being stable for prolonged periods at room temperature.

9. An article of manufacture as defined in claim 8 wherein the cellulose triester is the esterification product of a lower saturated aliphatic monocarboxylic acid.

10. An article of manufacture as defined in claim 8 wherein the cellulose triester is cellulose triacetate and the acid solvent is acetic acid.

11. As an article of manufacture, an acidic spinning dope comprising a cellulose triester having not more than about 0.1% combined sulfur, sulfuric acid and ammonium sulfate, the spinning dope consisting of the reaction product obtained by mixing cellulose, a lower aliphatic monocarboxylic acid, an anhydride of the acid, ammonium sulfate and sulfuric acid, at a temperature below about 60° C., raising the temperature of the mass to not more than about 90° C., maintaining the temperature of the mass between about 60° C. and about 90° C. for a sufficient period to form a fiber-free liquid mass containing partially esterified cellulose wherein some of the hydroxyl groups have been replaced by acid sulfate groups, adding water to the liquid mass to convert the free acid anhydride to acid and to remove substantially all of the sulfur containing groups from the cellulose ester and thereafter adding additional acid anhydride to substantially complete esterification.

12. An article of manufacture as defined in claim 8 wherein the cellulose triester is cellulose triacetate, the lower aliphatic monocarboxylic acid is acetic acid and the anhydride of the acid is acetic anhydride.

References Cited in the file of this patent

UNITED STATES PATENTS

| 2,095,240 | Coleman et al. | Oct. 12, 1937 |
| 2,099,753 | Roberts et al. | Nov. 23, 1937 |
| 2,475,678 | Rowley | July 12, 1949 |

FOREIGN PATENTS

| 501,808 | Belgium | Mar. 31, 1951 |